United States Patent
Dishington et al.

[15] 3,638,025
[45] Jan. 25, 1972

[54] METHOD AND APPARATUS FOR LOCATION OF RADIANT ENERGY SOURCE

[72] Inventors: Roland H. Dishington, Pacific Palisades; William R. Hook, Los Angeles, both of Calif.

[73] Assignee: TRW Inc.

[22] Filed: Oct. 1, 1963

[21] Appl. No.: 315,111

[52] U.S. Cl. ................................. 250/203, 178/7.6, 235/181
[51] Int. Cl. ........................................................... G01s 9/64
[58] Field of Search .................... 250/203, 83.3 IR, 233, 213; 343/100.7; 235/181; 250/213; 178/7.6; 324/77 G, 77 I; 244/3.16, 3.17, 3.18

[56] References Cited

UNITED STATES PATENTS

| | | | |
|---|---|---|---|
| 2,800,592 | 7/1957 | Rabinow | 250/233 |
| 2,838,678 | 6/1958 | Beese | 250/83.3 IR |
| 2,892,124 | 6/1959 | Rabinow | 250/233 X |
| 2,941,080 | 6/1960 | Hansen | 250/203 |
| 3,083,299 | 3/1963 | Cruse | 250/203 |
| 3,151,247 | 9/1964 | Auvermann | 250/233 |
| 3,290,506 | 12/1966 | Bertram | 250/203 |

*Primary Examiner*—Rodney D. Bennett, Jr.
*Assistant Examiner*—Daniel C. Kaufman
*Attorney*—Daniel T. Anderson, Edwin A. Oser and Jerry A. Dinardo

EXEMPLARY CLAIM

2. In an apparatus for determining the location, within a radiant energy field of view, of radiant energy emanative areas:
means for creating a two-dimensional image of said field at a reference plane;
means for modulating the radiation intensity of first and second elemental portions of said image in accordance with first and second subsantially random functions, respectively, so that the modulation waveform imposed on first and second elemental bundles of rays are distinctively indicative of the respective geometrical coordinates of the different elemental areas of the field of view from which said rays emanate;
photosensitive transducer means for generating an electrical signal which varies in amplitude as a function of the total radiant power of the radiation passed by said modulating means;
means for providing first and second reference signals respectively representative of the different substantially random modulations which said modulating means would impose on rays emanating from first and second elemental areas of said field of view;
correlation means for separately deriving the product of said electrical signal and said first reference signal and the product of said electrical signal and said second reference signal; and
means for separately integrating said products over a time period which is at least as long as the period of the lowest frequency component generated by said modulating means to produce information signals indicative of the presence and absence of high-intensity discontinuities at the first and second elemental areas of the field of view which are represented by said first and second reference signals.

7 Claims, 9 Drawing Figures

INVENTORS
ROLAND H. DISHINGTON
WILLIAM R. HOOK
BY
ATTORNEY

ROLAND H. DISHINGTON
WILLIAM R. HOOK
INVENTORS

METHOD AND APPARATUS FOR LOCATION OF RADIANT ENERGY SOURCE

The present invention relates to improved methods and apparatus for locating the relative positions of one or more discontinuities or objects encompassed within a radiant energy field and more particularly to a method and system for closed loop tracking or open loop location and indication of a radiant energy source.

While the methods and apparatus of the present invention may find application in various systems responsive to radiant energy it has particular utility in connection with systems such as those used for tracking aircraft, spacecraft, or celestial objects such as stars. For convenience, the invention is hereafter described in the particular exemplary embodiments which have been found most suitable for tracking of infrared emissive objects or for open-loop detection and indication of the location of such objects relative to the optical axis of a viewing system. It is, of course, to be expressly understood that the invention may have broad application in various other radiant energy responsive systems and there should be no inference that its applicability is limited to the particular exemplary systems hereinafter described.

In optical target tracking systems responsive to radiation such as infrared, ultraviolet or visible light, it is common practice to use photosensitive transducers or detectors of the single-cell type which are sensitive only to the amount of incident radiation and are not able to provide information concerning the spatial distribution or image pattern of the radiation. In systems utilizing such transducers it is necessary to provide other means in combination with the photosensitive cell for deriving information concerning the location of a target or radiant object relative to the central axis of the field of view of the optical system. The present invention relates to an improved method and apparatus whereby the input to a photosensitive transducer such as a photomultiplier tube or an infrared-sensitive photoconductive cell is modulated in a manner such that the modulation provides information concerning the exact direction from which the radiation emanates, and therefore, defines the relative position of the target-object with respect to a selected point in the field of view.

It is an object of the present invention to provide a method and apparatus capable of simultaneously locating a plurality of objects and discriminating against random and/or fixed pattern interference to a degree 10 to 20 db. better than previous systems.

It is another object of the present invention to provide a radiation sensing system for location or tracking of radiant objects which is operable even when the object brightness provides a signal of considerably lower amplitude than the internal noise generated in the photosensitive elements of the system.

It is still another object of the present invention to provide an improved system, for location and/or tracking of objects from which detectable electromagnetic radiation emanates, which is operable to discriminate against radiation emanating from randomly distributed objects or material in the field of view surrounding the object.

It is a further object of the present invention to provide an improved system for location and/or tracking of radiation emanative objects in which the apparent or indicated location of the target is not affected by the presence of other radiating objects in the field of view.

It is a still further object of the present invention to provide an object tracking system adapted to discriminate in favor of tracking objects having preselected shapes or radiation emittive geometries.

It is still a further object of the present invention to provide an improved system for determining the angular position of a discontinuity in a radiant energy field which is adapted to discriminate against extended area spots or objects and in favor of point sources of energy or small area discontinuities.

It is a different object of the present invention to provide a system of the general type described which has an improved ability to resist the ordinarily disturbing effect which energy from a second spot or discontinuity has on the position representative signal derived from the energy from a first spot.

It is a still different object of the present invention to provide a system of the general type described which has improved ability to derive information concerning the respective locations of a plurality of closely spaced targets or discontinuities in the same radiant energy field.

It is a general object of our invention to provide a system capable of detecting and tracking one of a plurality of objects in a single radiant energy field with improved rejection of photosensor generated thermal noise signals and background interference signals.

It is another general object of our invention to provide a system of the type described in which correlation is accomplished by optical multiplication and light integration of the multiplied signals.

To the foregoing ends, the present invention, in a preferred embodiment, provides a radiant energy object locating or target tracking system and method which comprises a radiant energy image modulator or reticle of a random or pseudorandom character such that it produces a wide band signal for each target within the field of view and with the signal representative of each target or target-sized spot having a distinct individual character when compared to the signal which is produced in response to a target sized spot having a different position. In addition, the system of the present invention, in accordance with a preferred embodiment employs coherent signal processing or correlation techniques for demodulation of the carrier signal. By correlating each signal component with a plurality of reference signals having characteristics corresponding to the signals which would be produced by targets having specific locations within the field of view, it is possible to find a comparison or correlation which uniquely and conclusively detects the presence of a target and identifies the coordinates of that target within the field of view. By arranging the random or pseudorandom image modulator and the associated correlation circuit to provide the narrowest possible correlation function, both in radius and in angle $\phi$, the system of the present invention enables simultaneous detection of two or more targets which are closely adjacent within the field of view.

In accordance with a further embodiment of the present invention, there is provided optical means responsive to radiation from a field of view for forming a radiation image at a predetermined reference plane. A first image modulator or reticle is positioned at that plane and is provided with a plurality of radiation transmissive elemental areas and a plurality of radiation opaque elemental areas for selectively transmitting and stopping portions of the radiation which form the image. A radiation detection element or transducer is positioned to receive all the radiation which is passed through the optical means and through the modulator. This detector element operates to generate an electrical signal corresponding to the total radiation incident thereon. The signal from the radiation detection element is amplified and utilized to energize a light source for producing a beam of radiation which varies in intensity as a function of the time varying amplitude of the electric signal. A second image modulator or reticle device is positioned in the path of the light beam from that light source and is adapted to spatially modulate the light beam in accordance with a predetermined function. Accordingly, the light beam emanating from the second reticle has an intensity, at any particular elemental area of a cross section thereof, which varies as a function of the signal amplitude generated by the transducer and also as a function of a reference variable provided by the second reticle. Thus, the elemental light beam emanating from any elemental portion of the second reticle field represents the product of two variables, one being a reference variable or wave and the other being the contemporary signal generated by the radiation transducer. These elemental light beams, emanating from the second reticle, are permitted to impinge on an integrating means which separately integrates the intensity of each elemental beam to form an output image or spatially distributed representation of the field of view which image depends on correlation of (1) the reference wave forms provided by the second reticle and (2) the signal derived from the photosensitive transducer.

The invention may be best understood by consideration of the following description with reference to the accompanying drawings in which.

It is difficult to fully appreciate the problems which are dealt with by the apparatus and method of the present invention, or the characteristics and advantages of the invention without first considering the systems and mechanisms which have previously been used for radiant energy tracking and object locating. In order to provide a familiarity with such prior art systems and the problems associated with the same, there is shown in FIG. 2 a typical apparatus for tracking radiant objects such as aircraft or missiles.

Figures 1, 2:
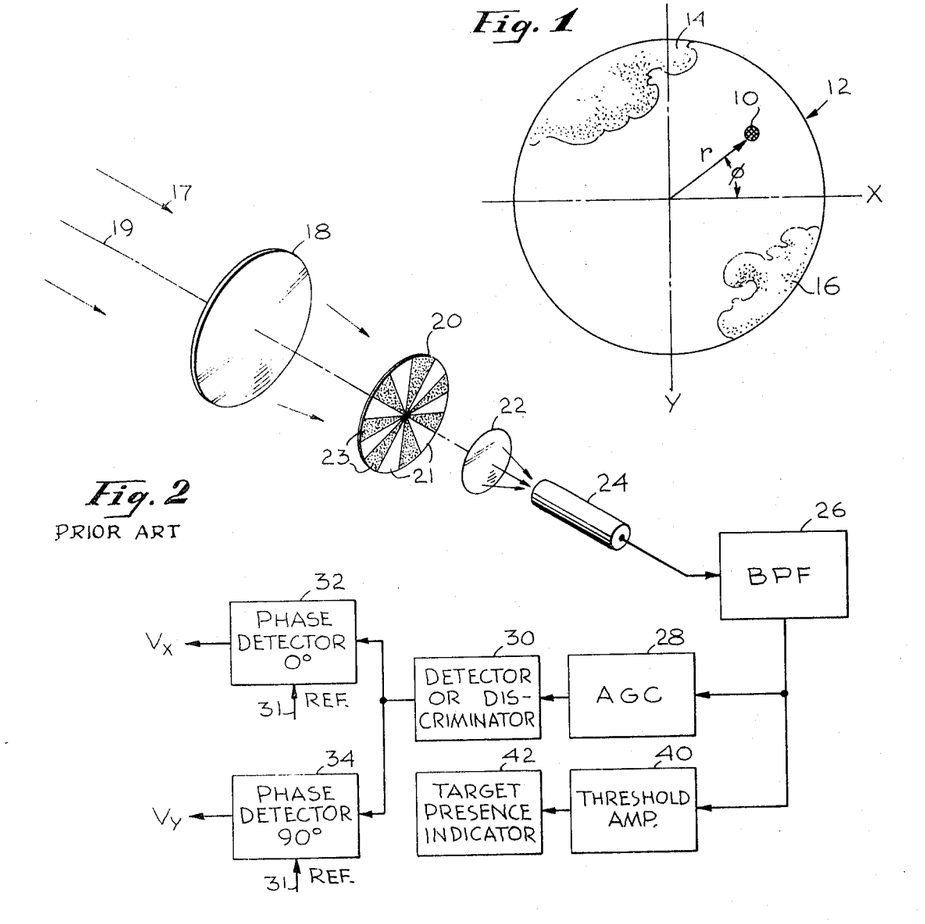
FIG. 1 illustrates a typical field of view encompassed by the optical system of a radiant energy tracking or object locating apparatus.
FIG. 2 is a schematic illustration of a typical prior art system useful in explaining the problems which the present invention overcomes.

As shown in FIG. 2, the radiant energy of a field of view such as that illustrated in FIG. 1 is indicated at 17 as falling upon an entrance optical system or lens 18 which collects the light from the field of view and directs the same through a mechanical modulator 20 and through a field lens 22 to impingement upon the sensitive portion or window of a photosensitive transducer 24. FIG. 2 shows a simple concentric reticle 20, although it will be recognized by those skilled in the art that the same type of modulation as that to be described below can be accomplished with systems employing both a reticle and a nutating or image-rotating optical means. The problems solved by this invention are not related to the mechanical configuration of the modulator but rather to the type of modulation generated, and thus the following comments apply equally to all prior art systems regardless of the mechanical configuration. The simple concentric reticle 20 is shown only to illustrate one typical method to mechanically generate a modulated carrier.

As noted heretofore, the transducer 24, which may be a photomultiplier tube or an infrared photoconductive cell, simply detects the amount of incident radiation and provides an output current which varies as a function of the incident energy. The transducer 24 is, per se, incapable of discerning where the radiation comes from and only knows that there are one or more sources of radiant energy within the field of view 12 (FIG. 1). In systems such as that illustrated in FIG. 2, the optical system 18, which may comprise one or a plurality of optical elements, provides an image of the field of view at a reference plane coincident with the plane of the modulator device 20. The device 20 is normally provided with a plurality of specially arranged holes or slots 21 and a plurality of opaque areas 23 so that when the modulator or reticle 20 is rotated the spatially distributed portions of the image are chopped by the rotating opaque spokes 23. The modulated beam of light which passes through the rotating reticle 20 falls upon the field lens 22 and is diffused or distributed by the field lens 22 so that substantially equal radiation intensity impinges on all parts of the sensitive areas of the transducer 24. That is, the main function of the field lens 22 is to spread or distribute the image over the surface of the transducer 24 to thereby avoid signal amplitude variations which might otherwise be introduced by variations in photosensitivity at different portions of the sensitive area of the transducer 24.

One general function of the circuitry following the cell 24 is to provide information concerning the location of coordinates of a target with respect to the optical axis 19. That function is accomplished by the cooperative action of the reticle 20 and the phase sensitive demodulating circuitry following the transducer 24. First consider an exemplary bright spot or target 10 in the field of view which has a radial position $r$ and an angular coordinate $\phi$. It is desired that the system provide information concerning the values $r$ and $\phi$ and also that the systems discriminate against other radiant objects, such as the sunlight reflecting clouds 14 and 16, which may be within the field of view. The light emanating from target object 10 forms a bright spot in the image at the plane of reticle 20. Thus, as the reticle rotates that bright spot or beam of radiation is switched on and off or chopped to provide an alternating current output from the transducer which is in effect a carrier wave having a fundamental frequency determined by the speed of rotation of the reticle 20 and the number of spokes 23.

Further, the particular arrangement of the spokes is such that the carrier wave is modulated, where the amount of modulation is made proportional to the radial position $r$ and the phase of the modulation is proportional to the angular coordinate $\phi$. A typical prior art reticle employs frequency modulation, where the modulation of the basic carrier is achieved by causing the spokes to vary in width and spacing around the reticle. As with communication systems the modulation band width can be made narrowband or wideband, again depending on the exact spoke arrangement. In an FM system, for instance, the rate of modulation is usually fixed and the spokes are arranged to give a smaller or larger modulation index, depending on the desired signal bandwidth. As a result of this mechanical chopping the modulated carrier wave derived from transducer 24 and applied to the band pass filter 26 will have a modulation phase, (relative to a sine wave reference) which depends on the angular location $\phi$ of the bright spot or target 10 in the field of view, and will have percent modulation which depends on the radial location of the target 10 in the field of view. The amplitude of the carrier wave will depend on the intensity of the bright spot 10 and on the size of the image bright spot 10 relative to the size of the spokes 23.

The modulated carrier wave from the transducer is passed by the band-pass filter 26 to a demodulator or demodulating system comprising an automatic gain control circuit 28, a detector or FM discriminator 30, and a pair of quadrature phase detectors 32 and 34 both having their input circuits coupled to the detector 30. Reference signals indicated by the numeral 31 are applied to the quadrature phase detectors in a conventional manner and may be derived from an appropriate reference signal generator which is coupled to or otherwise synchronized with the motor (not shown) which rotates the reticle 20. The general functions of the demodulating circuitry are to (1) produce a pair of output signals $V_x$ and $V_y$ which are proportional to the coordinates of the target 10, and (2) to produce a further signal to indicate whether or not there is an object having at least a predetermined minimum brightness within the field of view. The first function is accomplished by the AGC circuit 28, the detector 30 and the phase detector 32. The detector (or discriminator) 30 removes the modulation from the modulated carrier, producing a wave whose amplitude is proportional to the radial position $r$ and whose phase is proportional to the angular coordinate $\phi$. The phase detectors 32 and 34 perform the function of resolving these angular coordinates into rectangular coordinates, producing output signals $V_x$ and $V_y$ which are proportional to X and Y positions of the target. The target presence function is accomplished by means of a threshold amplifier 40 and an indicator 42 coupled in cascade in the order mentioned to the output of the band-pass filter 26. In conventional systems, the amplifier 40 simply monitors the amplitude of the carrier waves at the output of the band-pass filter 26 and produces an output signal only when the carrier amplitude exceeds a predetermined level. Thus the presence of a target having a predetermined brightness is signalled by the indicator 42 only when the carrier signal amplitude rises to a level corresponding to that of targets which are desired to be detected or tracked. It will be appreciated that the "target presence signal" from the indicator 42 may be utilized as a lock-on or tracking signal in accordance with the usual practice in closed loop tracking systems. Similarly, the output signals $V_x$ and $V_y$ conventionally are used as error signals for causing the optical system 18 to follow the target 10.

Figure 3:
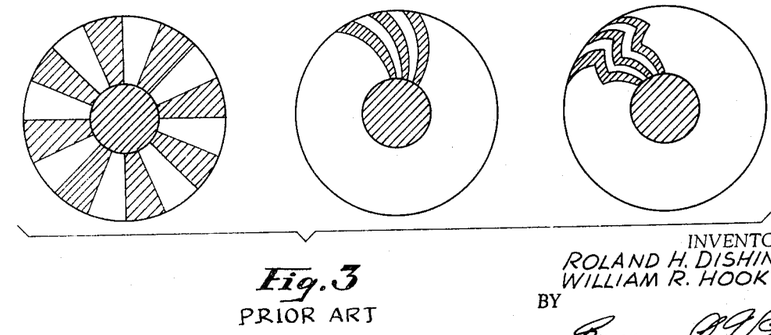
FIG. 3 illustrates a number of different mechanical modulators which have been used in prior art systems such as that in FIG. 2.

All such prior art systems are subject to a number of problems the most serious of which are the following:

In most applications the target must be located and tracked in the presence of extended low brightness objects such as clouds, the horizon and the like, and one desirable property of a reticle is the ability to minimize the signal which is generated by chopping these interfering objects. This background interference can be minimized only if the reticle is designed to perform a wide band modulation and if the reticle spokes are involuted or staggered as shown in FIG. 3. The most common prior art wide band modulation system is a wideband FM system. But as is well understood in the communication art, such wide band FM systems have a relatively poor weak signal sensitivity. That is, as the intensity of the target decreases toward the level of the internal noise from the transducer 24 the signal detection threshold of a wide band system is reached at a fairly high input signal level and the performance of the system quickly deteriorates. Accordingly, a wideband FM system will not locate or track targets or objects having low brightness.

A narrow band system can be used to improve the weak signal sensitivity, but then the ability to minimize the background is seriously reduced. There is no one prior art system which has high sensitivity in the presence of transducer cell noise and which has the ability to minimize the amount of interference generated by backgrounds such as cloud cover.

Another problem relates to the inability of prior art systems to locate a target when the ratio of generated signal to generated background interference falls below one. There is no prior art system which can locate and track under these conditions. A related problem is that of multiple targets. No prior art system can locate a target unless the signal generated by the target exceeds the sum of the signals generated by all the other targets. Thus, a weaker target cannot be located if there are stronger targets in the field of view, and therefore none of the prior art systems can provide accurate or dependable position information with respect to a plurality of targets in the same field of view.

Any background interference can conveniently be considered to be composed of a collection of target sized spots. That is any background such as a cloud can be considered the same as a collection of spots with each spot having a size equal to the effective resolving power of the optical system. That is, if the optical system of an apparatus such as that shown in FIG. 2 has the ability to resolve or distinguish two adjacent spots of diameter $d$, and is unable to resolve or distinguish objects having a distance between their centers smaller than the diameter $d$, then for that particular system any cloud or object may be considered as being comprised of a collection of spots of diameter $d$. It may be considered that each such spot, when modulated by a reticle-type modulator produces carrier power in the same frequency band as a target having a diameter $d$ equal to the blur circle size of the optics. The logical way to minimize the total power generated by all such spots is to provide a system which causes the individual signal contributions of all such spots to add in a root-means-square manner or in a random phase regardless of the positions of the different spots in the field of view. By providing a system having that characteristic, the background interference problem which has faced all prior art target-tracking and target-locating systems can be overcome.

Figures 4, 5, 9:
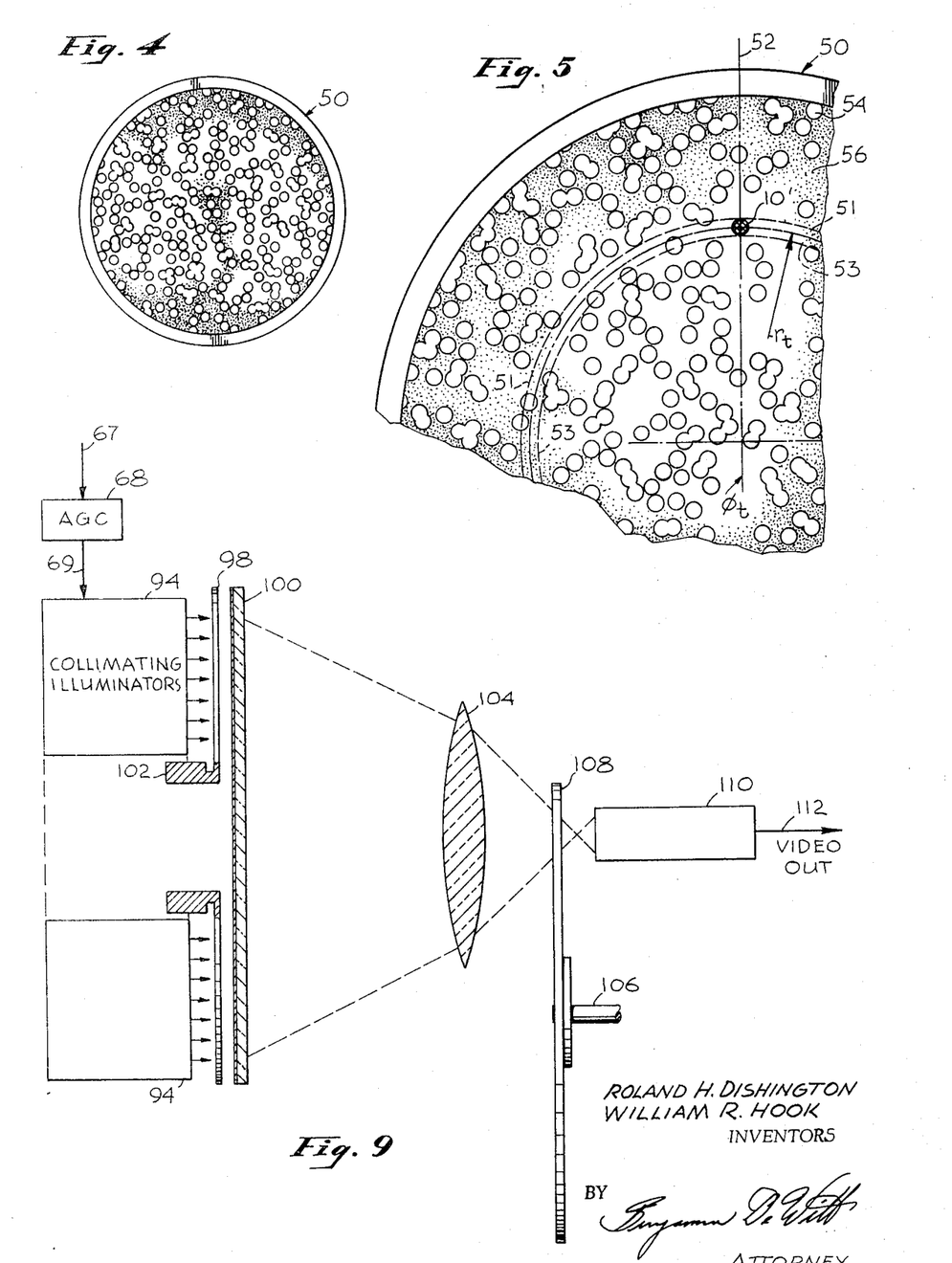
FIG. 4 illustrates an improved radiation modulation device in accordance with the present invention.
FIG. 5 shows an enlarged fragmentary portion of the device illustrated in FIG. 4 with a portion of the field of view of FIG. 1 being superimposed or imaged on the modulating device.
FIG. 9 schematically illustrates a further embodiment of a signal-processing system in accordance with our invention.
Figures 6, 7, 8:
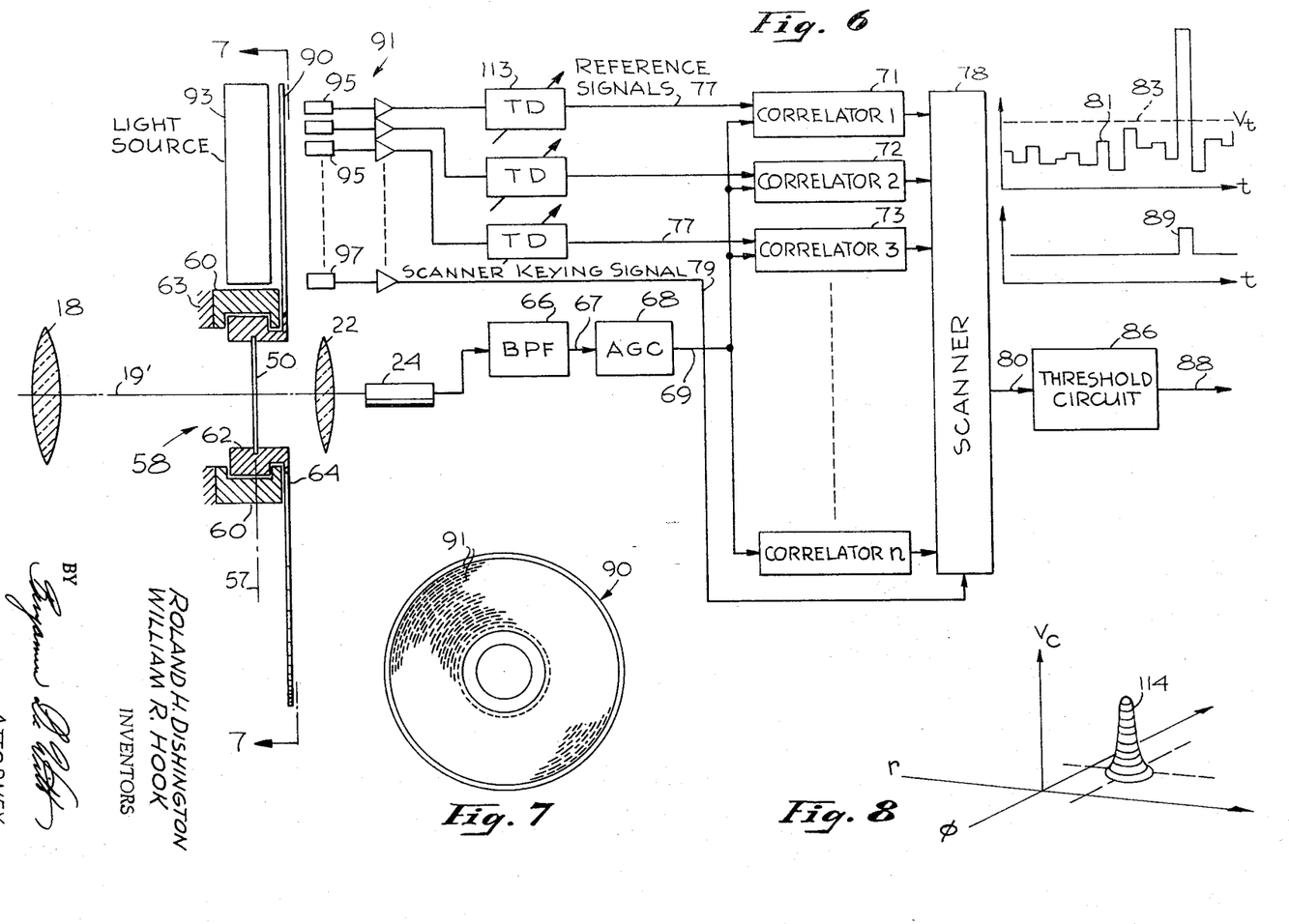
FIG. 6 schematically illustrates an improved radiation modulating and coherent signal processing system in accordance with the present invention.
FIG. 7 is a sectional view taken along the lines 7—7 of FIG. 6.
FIG. 8 is a graphical illustration of the type of output signal which may be provided by systems such as that of FIG. 6 in accordance with our invention.

An exemplary system embodying the foregoing features of our invention is illustrated in FIGS. 4, 5 and 6.

FIG. 6 illustrates partially in block diagram form a system which may be utilized either for tracking objects or discontinuities in a radiant energy field or for open loop indication of the angular position of one or more radiant objects relative to the optical axis 19' of the system. When the optical axis 19' is directed generally toward a particular field of view, radiant energy emanating from objects within the field of view is collected by the light collecting optical components (represented schematically by the entrance lens 18) and an image of the field of view is formed at a reference plane 57. Mounted substantially coincident with that reference plane is an image-modulating disc or reticle 50 which is supported within the inner race 62 of a bearing which has its outer race 60 fixedly mounted as indicated at 63. Obviously, the inner race 60 may be driven by an synchronous motor through any conventional linkage. Obviously the image modulator 50 may be otherwise peripherally journaled and other means may be utilized for rotating the same about its own center. The one requirement is that the means for rotatably driving the image modulator 50 must provide an output shaft or coupling 64 to which may be coupled an associated mechanism 90 to be described in further detail hereinafter.

FIG. 4 shows a view of the image modulator or reticle 50 as seen from a viewpoint along the optical axis 19'. By consideration of FIG. 4, it may be appreciated that the reticle comprises an opaque planar member having a large plurality of holes or radiation transmissive elemental areas 54 through which radiation from the field of view may pass to the field lens 22 and the photosensitive transducer 24 as shown in FIG. 6. The holes 54 are randomly distributed over the areas of the reticle 50 in a manner such that a beam of light projected on any elemental portion of the image plane 57 is modulated in accordance with a unique function which is different from the function by which a beam at any other position would be modulated. This characteristic is illustrated in FIG. 5 where the numeral 10' indicates the image formed on the surface of reticle 50 by light emanating from a particular target such as the target 10 shown in FIG. 1.

From consideration of FIG. 5, it may be observed that a target image 10' having a radial position $r_t$ will be modulated by a single concentric annular ring portion of the reticle 50 as indicated by the lines 51 and 53. Since the apertures between the lines 51 and 53 are randomly distributed, the radiation passing from the target 10 and through the reticle 50 will be randomly modulated and hence will generate, at transducer 24, an electrical wave of random character which may be considered a particular noise wave. Now suppose that there is a second target having the same radius $r_t$ within the field of view but having a different angular position $\phi$. It will be noted that this second target will be intercepted and modulated by the same annular ring as defined by the lines 51 and 53. However, the signal generated in response to this second target will differ from that generated by the first target image 10' in that it will have a completely different phase. That is, rather than being modulated by the function $f(t)$ it will be modulated by the function $f(t-T)$. Since the signal wave produced by the transducer 24 in response to the first image spot 10' is a noise wave, the signal produced by the supposed second target spot is another noise wave which is unrelated in time and is therefore completely unrelated to the first signal. This is true because of the fact that two noise waves having a phase difference are completely different in the mathematical sense. It should be noticed that the ring defined by the lines 51 and 53 is concentric to the field of view and therefore is concentric to the axis. Within this ring, the desired randomizing of all background interference (such as clouds) must be achieved by generating a signal which has a narrow autocorrelation function. This means that the signal should be wide band modulation since a narrow correlation function inherently specifies relative independence and no similarity of waves generated by spots located at different positions around the ring. Moreover, it will be appreciated that since the apertures or transmissive portions 54 are distributed randomly over the entire surface of the reticle, signals generated by image spots located at different radial distances will be different random noise waves having no similarity and having substantially no cross-correlation characteristic.

Thus, as the reticle 50 rotates past a particular target image 10', that target image is intensity modulated in accordance with a noiselike function which depends on the random arrangement of the apertures 54 within the circular ring defined by the lines 51 and 53. The modulation of the target image 10' has specific characteristics which are completely different from the characteristics of the modulation imposed on any other target spot within the field of view. Targets lying along a given radial line 52 are differently modulated by virtue of the fact that the modulation waves generated by different concentric elemental ring sections of the reticle are totally unrelated. Targets having the same radial distance from the center of the field of view but having different angular positions $\phi_1$ and $\phi_2$ are modulated by the same circular portion of the reticle but the resulting signals are completely different for the purposes of correlation detection because of the time delay or phase difference between the respective modulations. The radiation from all target spots within the field of view and all background interference within the field of view, as modulated by the reticle 50, impinges simultaneously on the transducer 24. Thus, the transducer 24 produces a current or signal which is the sum of all the modulated target images and modulated background interference plus the thermal noise or cell noise generated by the transducer itself. The output signal from the transducer 24 is coupled through the band-pass filter 66 and the gain control circuit 68 to a large plurality of multiplying-type correlator circuits 71, 72, 73 . . . . That is, the output line 69 from gain control circuit 68 is connected in parallel to the first input terminal of each and every one of the correlator circuits 71, 72, etc.

Each one of the correlator circuits has a second input terminal to which there is applied a distinctive reference signal derived from a reference signal generating means 91. The purpose and function of the reference signal generator 91 is to provide a plurality of different reference signals each of which is exclusively representative of the signal which would be generated by a target image located at some particular elemental portion of the primary reticle 50. To that end, there is provided a second reticle or light beam modulator 90 mounted on the same shaft for rotation in synchronism with the primary reticle 50. The structure of the second modulator 90 is best shown in FIG. 7. It preferably comprises a thin disc of opaque material having a plurality of rings or circularly extending groups of apertures or slots 91 adapted to modulate the light which passes from a light source 93 to a plurality of separate photocells 95. The photocells 95 are arranged in a radial line adjacent the rotating modulator 90 so that a separate circular group of light transmissive portions 91 operates to modulate the light falling on each separate one of the photocells 95. Thus, a reference signal is generated by each one of the photocells 95. The reference signal developed by each photocell 95 is completely different from that generated by any other one and corresponds to the electrical signal which would be developed in the transducer 24 by a single noise-free target spot 10 modulated by the primary reticle 50. Thus the different photocells 95 generate signals corresponding to targets at different radial positions in the field of view. By providing variable time delay means 113 in the lines from the photocells 95 to the different correlators 71, 72, etc., the reference signals can be made to correspond to targets having different angular positions.

One method of constructing the reference signal generating reticle 90 is as follows: Firstly, a pencil beam of light is focused on a photosensitive material coated on one surface of the disc 90. The pencil-beam forming light source (not shown) is energized by an amplified electrical signal from a primary transducer 24 so that the photosensitive emulsion is exposed in a pattern corresponding to the manner in which the primary reticle 50 modulates the light from a single spot in a synthetic field of view. The disc 90 may then be etched (or otherwise processed in accordance with any one of a number of conventional practices) to provide apertures or slots in the areas which have been photographically sensitized. Alternatively, the disc 90 may comprise a magnetic recording disc to which reference signals are applied by a recording head which is energized from the primary transducer 24. In such an arrangement, the reference signals are read out of the record by means of a plurality of magnetic pickup heads which take the place of the photocells 95. Further it will be appreciated that a synchronized magnetic drum might readily be utilized in place of the reference modulator 90 to provide a plurality of reference signals corresponding respectively to a plurality of target images located at different elemental portions of the primary reticle 50.

In addition to generating the reference signals which are fed to the second input terminals of the correlators, by way of lines 77, the reference modulator 90 may also be used to modulate the illumination of an auxiliary photocell 97 which thereby generates a keying signal which is applied to line 79 and used in a manner to be described hereinafter.

The multiplying correlators 71, 72, 73, etc., may take any one of various forms. A particular circuit which is preferably employed to perform the coherent signal processing function of correlators 71, 72, etc., is disclosed in copending application Ser. No. 199,797 filed June 4, 1962 and entitled "Automatic Stereomapping System" which is assigned to the same assignee as that of the present invention. Since the particular circuit which might be used to perform the correlation function is not, per se, a feature of the present invention, it will not be disclosed in further detail herein. It is sufficient for present purposes to state that the correlators 71, 72, etc., are devices which individually constitute means to receive at their first and second input terminals a pair of signals $f(t)$ and $g(t)$ and to produce in response to those signals, a single output wave of the form:

$$e_o = K \int_0^T \Big( [f(t)+g(t)]^2 - [f(t)-g(t)]^2 \Big) dt \qquad (1)$$

It can be shown that a correlating device for performing the above-described multiplying and integrating function is essentially an apparatus which continuously derives the product of the time coincident instantaneous amplitudes of the different signals $f(t)$ and $g(t)$ and integrates those incremental products over a selected time period $T$ to produce an output signal or voltage which is a measure of the degree of similarity or correlation between the two input signals over that time period. The theory of multiplying correlators is considered, at length, in Truxal, J. G. *Control Systems Synthesis* (McGraw Hill 1955) pages 444–453 and reference may be had thereto for a more complete appreciation of the theory and operation of such circuits and devices. Essentially, the signal-analyzing process defined by the equation set forth above is a time domain concept representing the following steps: (1) the amplitude of each time-incremental portion of the first signal $f(t)$ is multiplied by the contemporary portion of the second signal $g(t)$, and (2) an average is taken of the resulting products over a period which is allowed to become infinite (or in a practical case, over a period which is long compared to the period of the lowest frequency components of the signals $f(t)$ and $g(t)$.

In the apparatus of the present invention, the correlator 71, for example, receives a contemporaneous signal from line 69 which is a mixture of the signals produced by all targets within the field of view plus the background noise and the noise generated in the photosensitive transducer 24. At the second input line 77, the correlator 71 receives a noise-free reference signal representative of a target having coordinates $r_1$, $\phi_1$, in the field of view. The successive correlators 72, 73, etc., receive at their second input terminals noise-free reference signals corresponding respectively to targets having coordinates $r_2$, $\phi_2$ and $r_3$, $\phi_3$, etc. If a bright spot or target actually is present, at the elemental area of the field of view which has the coordinates $r_2$, $\phi_2$, the correlator 72 will detect the fact that the contemporary signal from line 69 has a substantial component which is similar to the reference signal applied to the correlator 72. That is, the integral of the products of the time coincident instantaneous amplitudes as derived by correlator 72 will be a DC voltage at least four or five times larger than the RMS noise voltage produced by the other correlator 71, 73, etc. The output terminals of all the correlators are connected to different input terminals of a scanning means 78 which may, for example, comprise a high-speed electronic sampling switch. The scanning means 78 sequentially samples outputs of all the correlators and produces at its output line 80 a signal 81 having time sequential portions indicating the degree of correlation of the signals applied to the different correlators 71, 72, etc. The sampled signal is applied by way of output line 80 to a threshold circuit 86 which operates to block all signals having amplitudes less than a predetermined amplitude value $V_t$ as indicated by the dotted line 83. Thus, at the threshold circuit output line 88, there is produced a signal 89 indicative of detection of a target having a specific position $r_i$, $\phi_i$ within the field of view. The signal produced at the output line 88 of the threshold circuit may, of course, be used for actuation of a target-presence-indicating circuit (not shown) or, where the apparatus is used in a closed loop tracking system the signal from line 88 may be used to perform a conventional "lock-on" function. Persons skilled in the art will readily understand how the signal 89 together with the scanner keying signal and signals representative of the time delay settings of units 113 may be used together to provide target position polar coordinates $r$, and $\phi$.

As noted heretofore, the reference-signal-generating means 91 may comprise any one of various devices or arrangements by virtue of which reference signals may be permanently stored and continuously reproduced. An additional method for storing such signals is to provide a synthetic field of view for the primary optical system 18 with a single bright spot in the field of view which is movable in a radial direction. In order to permanently store a "particular target" representative signal on the reference disc 90 the primary photosensitive transducer 24 is temporarily connected through an amplifier (not shown) to energize the light source or lamp 93. The synthetic bright spot in the field of view is then moved outwardly along a radial line in the field of view. At radial increments, a circular track is recorded on the reference disc 90 either in the form of a magnetic record on the disc, or in the form of sensitization of a photographic emulsion to enable selective etching to provide a circle of apertures of slots. When the reference record is created in this manner, discrete numbers of reference waves corresponding to discrete reference circles 91 on the disc 90 are formed. The radial spacing of the reference waves 91 is related to the radial correlation function. That is, the radial distance between adjacent reference circles 91 should be such that the correlation response curves provided by the correlator 71, 72, 73, etc., are closely adjacent but not overlapping. There is, of course, a correlation function both in radius $r$ and in angle $\phi$ of the position of target 10 in FIG. 1. The angle $\phi$ may be determined with the same accuracy as the radial position $r$ of the target. In a closed-loop tracking system, it is preferable that the correlation circuitry should provide an error signal which varies as a function of the radial position $r$ of the target. It will be apparent to those skilled in the art that conventional circuitry may be used for generating a voltage proportional to the radial position as indicated by the time relationship between the output pulse 89 at line 88 and the scanner keying signal appearing at line 79. It will be readily apparent that the time spacing between these two signals is indicative of which correlator the scanner was connected to at the time the pulse 89 was transmitted to the threshold circuit 86 and is, therefore, indicative of the polar coordinate $r$ of the target or object represented by pulse 89.

By consideration of the curves 81 and 89 at the right-hand side of FIG. 6, it will be observed that no one of the correlators 71, 72, etc., will have an output voltage exceeding the threshold level $V_t$ as long as there is no target of a preselected brightness in the field of view. The important feature to be noted here is that the noiselike signal generated by the transducer 24 in response to a large plurality of extended radiation sources such as clouds does not add to produce an output from the correlators 71, 72, etc. Thus the combination of the correlators 71, 72, etc., with the threshold circuit 86 enables the apparatus of the present invention to discriminate against background noise or interference such as clouds and the like. The correlation circuitry not only provides signals indicative of the position of a particular target within the field of view, but also by means of the threshold function provides an indication that there is a target or object having a predetermined brightness somewhere in the field that is being viewed.

Correlator elements such as the devices 71, 72, 73, etc., of FIG. 6 when operated with constant input power (signal plus noise), and with constant bandwidth noiselike signals, are characterized by the fact that they produce a constant output noise level. That is, the noise of the correlator circuit 71 is the same whether the two inputs are from two independent noise sources or from the same noise wave. When the two inputs are unrelated or uncorrelated the output noise is a wave which varies randomly about 0 volts direct current. When the two inputs are similar or identical, the output varies about the average correlation value. It can be shown as follows that the root-mean-square value of the output noise depends on the ratio of the output bandwidth $B_o$ to the input bandwidth $B$.

As stated heretofore, correlation signal processing basically is the process of multiplying two time-varying voltages together instantaneously and then integrating by some kind of low pass filtering. If it is assumed that the signal applied to the correlator 71 from line 69 is accompanied by noise so that it is of the form $S_1+N$ and if the reference signal at input line 77 is a noise-free signal $S_2$, then the total power input, to the correlator 71 for example, is;

$$P_1 = S_1 + N$$
$$\text{and } P_2 = S_2 \tag{2}$$

Since the ultimate result being derived is a signal-to-noise ratio the internal gain factors of the two signal channels may be neglected. The output from correlator 71, therefore, is composed of a band of low pass noise and a direct current signal having an amplitude $$\overline{V} = S_1 S_2 \, \rho(t) \tag{3}$$

Therefore, the RMS value of the output noise is:

$$\frac{N}{\sigma_N} = \left[ P_1 P_2 \frac{B_0}{B} \right]^{1/2} \tag{4}$$

Where $P_1$ and $P_2$ represent the power of the two input signals applied to the correlator 71 from lines 69 and 77 respectively. If the input waves are related to some extent, a direct current component appears in the output of the correlator. The ratio of this direct current $\overline{V}$ to the output noise $\sigma_N$ is given by:

$$\frac{\overline{V}}{\sigma_N} = \left[ 1 + \frac{N_1}{S_1} \frac{B}{B_0} \right]^{1/2} \rho(t) \tag{5}$$

Where $N_1/S_1$ is the ratio of noise power to the signal power at the input line 69, where the second input signal at line 77 is noise free, and where $\rho(t)$ represents the shape of the correlation function with a maximum value of 1. A correlation function is graphed in FIG. 8 in two dimensions with the detection of a target shown as a voltage peak 114 at a particular value of radial position r and angular coordinate position $\phi$. As indicated by the foregoing equation (5), in actual practice, the correlation voltage output from one of the correlators 71, 72, etc., is not the idealized curve 114 as shown in FIG. 8 but is a peak of lesser magnitude surrounded by random noise much like a choppy ocean surrounding the curve 114 in FIG. 8. The output of the correlator 71 at points far removed from the true target position is a noise wave which has a predictable RMS value but random in its instantaneous value. The important thing to understand is that the output noise is constant and has a predictable RMS value no matter whether the input to the correlator from line 69 is a legitimate target in the field of view or is random noise such as that generated in the photosensitive transducer 24. If the input is random transducer noise there is no substantial correlation anywhere in the plane of the r and $\phi$ axes of FIG. 8 and thus there is no peak. If there is a target of bright spot in the field of view, there will be a peak 114 as indicated in FIG. 8 and it will have coordinates corresponding to the target location. It will not cause any change in the output noise at locations removed from the peak. This enables the use of a threshold technique such as the circuit 86 for discriminating against random noise to produce a signal 89 indicative of the presence of a target having brightness exceeding a predetermined level. For example, if the threshold voltage $V_t$ is set at about three times the RMS noise output $\sigma_N$ then the random noise will normally be below the threshold level $V_t$ and false indication of targets will occur only about 0.1 percent of the time. On the other hand, as soon as the output signal $\bar{V}$ equals or exceeds the threshold voltage $V_t$ a target will be reliably indicated as being present. This means that the correlation system has an output signal to noise ratio of about 9 decibels.

The significance of the foregoing is that targets can be detected when the input signal-noise ratio is far less than one, since the quantity $B/B_o$ in equation (5) is typically 1,000. Thus the modulation bandwidth can be very wide in order to minimize the background generated signals, and yet there is no wide band sensitivity threshold as there is with conventional FM systems. This, therefore, is a system which has a maximum performance in the presence of both background interference and internal cell noise. Furthermore, for the same reasons, a target can be located and tracked when the generated background signal exceeds the generated target signal, or when the sum of the signals from other targets in the field of view exceeds the desired target signal. Thus the apparatus of the present reticle 98 and integrator 100. The multiplying function which is required for correlation is performed by the combination of collimating lamp 94 being modulated by the input signal from line 69 and the rotation of the reference reticle 98. The amount of light passing through the reference reticle 98 at any elemental portion of the field is a function of how well the modulated light intensity matches or coincides with the apertures in the reference reticle 98 at that particular area.

At the right-hand side of the reference reticle 98 there is positioned a light-integrating means 100 which may for example be a phosphor disc adapted to integrate the light impinging on each elemental portion to form an image which varies in brightness from area to area in accordance with the correlation function at the different areas. Thus the output of the correlation system of FIG. 9 consists of the distribution of light intensity or brightness emanating from the right-hand side of the integrating plate 100. This basic mechanism can be viewed directly to give an indication of the location of one or more targets. That is, the plate 100, directly viewed, indicates targets as bright spots distributed on the plate 100 in the same manner as they are distributed in the field of view of FIG. 1. For closed-loop tracking systems, the integrating plate 100 may be scanned by a mechanical or electrical scanning system capable of generating signals indicative of the position or positions of one or more targets. One such scanning system is shown in FIG. 9 as comprising a conventional Nipkow disc 108 mounted for rotation on a shaft 106 with an optical system represented by the lens 104 for focusing an image of the integrating plate 100 at the plane of the Nipkow disc 108. The structure and arrangement of a Nipkow disc scanning system are well known in the art and hence is not necessary to describe the same in detail. One example of such a scanning system may be found in copending application Ser. No. 247,944 filed Dec. 28, 1962 now U.S. Pat. No. 3,290,506, which application is assigned to the same assignee as that of the present application. For present purposes, it is sufficient to note that the Nipkow disc scans or disects the image appearing on the integrating plate 100 so that the light from elemental portions of the image is sequentially permitted to impinge on a photocell or transducer 110 to thereby produce a conventional video signal at output line 112, which can be processed to give target positional information by means of conventional apparatus (not shown). One example of such apparatus may be found in V. K. Zworykin and G. A. Morton, *Television*, (John Wiley and Sons, Inc. 1954), page 266, FIG. 8.1.

Since the function of the secondary scanning system comprising elements 104, 108, 110 and 112 is to provide information concerning the location of targets on the integrating plate 100, the secondary scanning system does not present problems of sensitivity, noise degradation or background interference. Other scanning mechanisms well known in the video arts such as an image Orthicon or Vidicon camera may be used alternatively to perform the secondary scanning function which is provided by the Nipkow disc 108 in the apparatus of FIG. 9. The principal advantage of the optical correlation system illustrated in FIG. 9 is that it correlates continuously and separately at every elemental portion of the field of view. It requires no additional equipment in order to locate or track a plurality of bright spots or targets within the field of view. It will be recognized that other arrangements of the modulating lamp 94, reticle 98 and integrator 100 are possible. For example, the light might be from a modulatable diffuse source, which would be imaged by a lens onto the reticle 98. The reticle output would then be imaged by a second lens onto the integrating surface 100.

While the present invention has been described with reference to certain specific embodiments only, it will be obvious to those skilled in the art that it is not so limited but is susceptible of various changes and modifications without departing from the spirit and scope thereof.

The embodiments of the invention in which an exclusive property or privilege is claimed are defined as follows:

1. In a tracking apparatus, means for establishing a beam of radiant energy and creating an image of a remote energy source at a reference plane;

a first rotatable reticle for modulating the intensity of each elemental cross-sectional portion of said beam in accordance with a predetermined function of time, said rotatable reticle being adapted to rotate about an axis perpendicular to the reference plane and having a plurality of randomly distributed radiation transmissive elemental portions;

radiation-sensitive means for receiving the energy of the modulated beam to produce a corresponding electrical signal;

a local source of radiation to be used for generating reference signals;

radiation-sensitive means adapted to receive energy from said local source;

a second rotatable reticle, having a plurality of radiation transmissive elemental portions distributed in a pattern operatively identical to the distributional pattern of the radiation transmissive elemental portions of said first reticle, for modulating the radiation passing from said local source to said second radiation sensitive means to provide a plurality of reference signals;

means for instantaneously multiplying the amplitude of each of said reference signals by the time coincident amplitude of said image signal; and means for separately integrating the resulting products corresponding to each of a plurality of elemental cross-sectional portions of said beam.

2. In an apparatus for determining the location, within a radiant energy field of view, of radiant energy emanative areas:

means for creating a two dimensional image of said field at a reference plane;

means for modulating the radiation intensity at first and second elemental portions of said image in accordance with first and second substantially random functions, respectively, so that the modulation waveform imposed on first and second elemental bundles of rays are distinctively indicative of the respective geometrical coordinates of the different elemental areas of the field of view from which said rays emanate;

photosensitive transducer means for generating an electrical signal which varies in amplitude as a function of the total radiant power of the radiation passed by said modulating means;

means for providing first and second reference signals respectively representative of the different substantially random modulations which said modulating means would impose on rays emanating from first and second elemental areas of said field of view;

correlation means for separately deriving the product of said electrical signal and said first reference signal and the product of said electrical signal and said second reference signal; and means for separately integrating said products over a time period which is at least as long as the period of the lowest frequency component generated by said modulating means to produce information signals indicative of the presence and absence of high-intensity discontinuities at the first and second elemental areas of the field of view which are represented by said first and second reference signals.

4. In combination:

means for collecting a portion of the radiation emanating from a radiant energy field of view to form an image at a reference plane;

a rotatable reticle positioned substantially at said plane and adapted to be rotated about an axis substantially normal to said plane, said reticle having a plurality of radiation opaque portions and a plurality of radiation transmissive portions, with each of said transmissive portions having an area of about the same order of magnitude as the area of the blur circle of said radiation-collecting means, and with said transmissive portions being distributed over the area of said reticle in a substantially random fashion said reticle being further characterized in that for any particular location on the field of view the two-spot cross-correlation function of the reticle exhibits a singular main correlation peak having a half-power width equal to or less than four times the diameter of said transmissive portions and having subsidiary correlation peaks smaller than one-third the amplitude of the main peak;

means to receive the radiation from said field which is passed through said transmissive portions for generating an electrical signal which varies as a function of the angular distribution of the transmissive portions which are intercepted by the particular rays; and correlation means for comparing said electrical signal with a plurality of reference signals to produce output signals indicative of the geometrical coordinates of those elemental areas of said field which have a radiant intensity at least as high as a preselected minimum intensity.

5. In a tracking apparatus:

means for creating an image of a remote energy source at a reference plane;

a substantially circular disclike member formed of radiation opaque material and positioned substantially at said reference plane and rotatable about an axis normal thereto;

said member having a diameter several orders of magnitude greater than its thickness and having at least several thousand irregularly interspaced light transmissive portions, with the interspacing of said portions being such that said member, when rotating, serves to modulate the radiation intensity of each elemental area of said image in accordance with a predetermined function which is uniquely different from the function by which any other elemental image area is modulated;

transducing means responsive to the modulated image radiation traversing said light transmissive portions for generating an electrical signal corresponding to the modulated radiation; and correlation means for comparing said electrical signal with a plurality of reference modulation characteristics; each exhibiting a spectral energy distribution which is substantially flat over several frequency octaves, to produce information signals representative of the relative position within said image of those elemental image areas which exceed a predetermined brightness.

6. In a system for detecting discontinuities within a radiant energy field of view:

means for forming a radiation image of said field at a first predetermined plane;

a first wide band modulation means, having at least several thousand irregularly interspaced radiation transmissive elemental area portions, for modulating the radiation impinging upon a plurality of separate elements of said plane in accordance with a corresponding plurality of individually distinct wideband modulation functions;

said first modulation means being further characterized in that each of said modulation functions exhibits a spectral energy distribution which is substantially flat over at least one frequency octave;

transducing means responsive to the radiation passed by said modulation means for producing a correspondingly modulated electrical signal;

light source means for producing a beam of radiation which varies in intensity as a function of said signal and directing said beam to a second predetermined plane;

a second modulation means positioned between said light source means and said second plane for individually modulating a plurality of different incremental cross-sectional portions of said beam in accordance with a corresponding plurality of modulation functions which are individually identical to the functions by which said first modulation means modulates the radiation impinging at geometrically corresponding portions of said first predetermined plane;

and means for individually integrating the radiant energy impinging upon different incremental cross-sectional portions of said second plane with such integration being over time periods which are of the order of the period of the lowest frequency component generated by said first modulating means.

7. In an apparatus for determining the location, within a radiant energy field of view, of radiant energy emanative areas:

means for creating a two-dimensional image of said field at a reference plane;

means for modulating the radiation intensity at first and second elemental portions of said image in accordance with first and second substantially random functions, respectively, so that the modulation waveform imposed on first and second elemental bundles of rays are distinctively indicative of the respective geometrical coordinates of the different elemental areas of the field of view from which said rays emanate;

photosensitive transducer means for generating an electrical signal which varies in amplitude as a function of the total radiant power of the radiation passed by said modulating means;

means for providing first and second reference signals respectively representative of the different substantially random modulations which said modulating means would impose on rays emanating from first and second elemental areas of said field of view;

cross-correlation means for individually deriving the products of (i) said electrical signal multiplied by said first reference signal, and (ii) said electrical signal multiplied by said second reference signal and individually integrating said products to produce at least first and second output signals respectively indicative of the presence and absence of radiation discontinuities at the first and second elemental areas of the field of view which are represented by said reference signals.

* * * * *